2,398,761

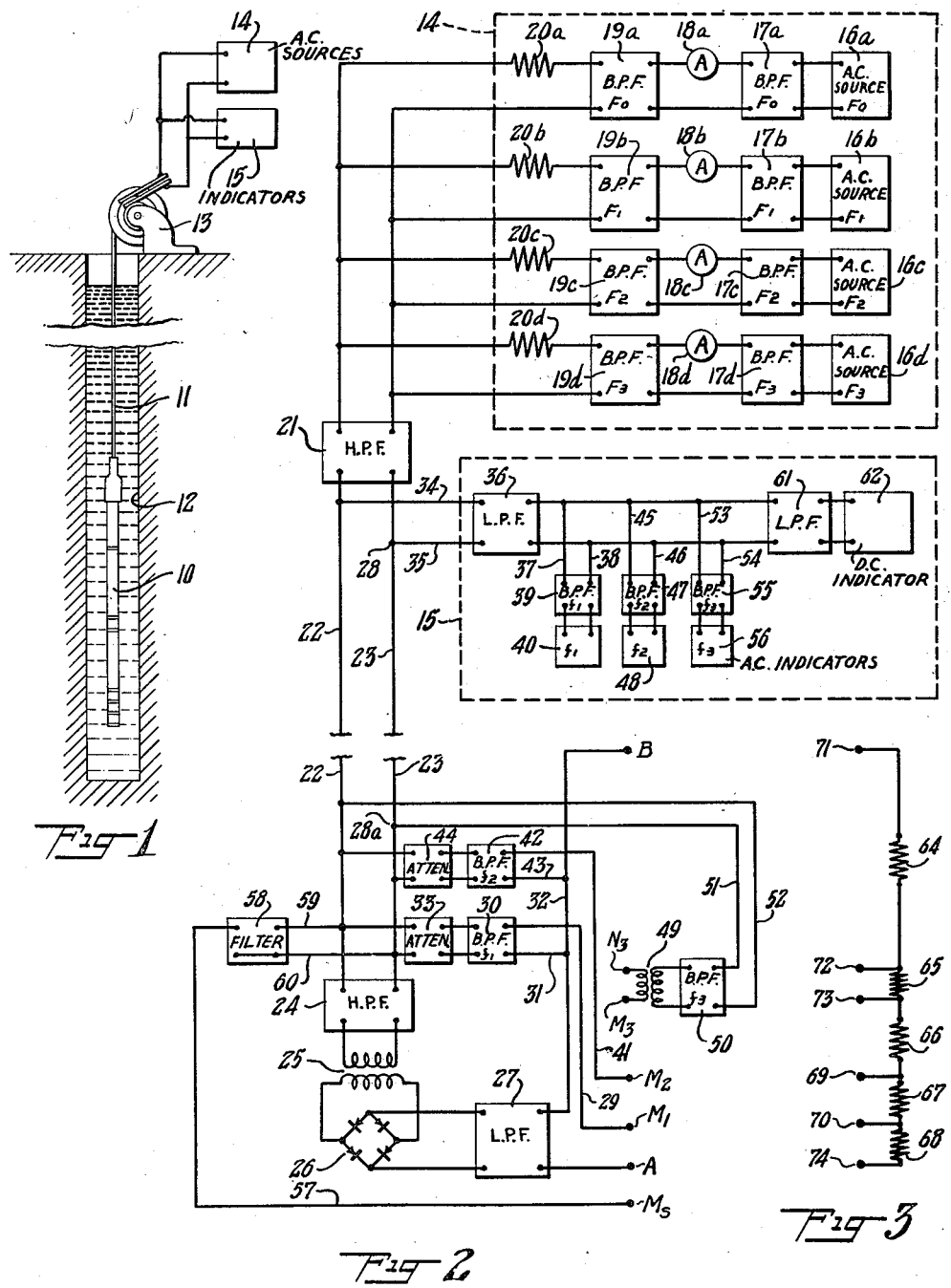
April 23, 1946.  C. B. AIKEN  2,398,761
METHOD AND APPARATUS FOR SIMULTANEOUS DETERMINATION
OF VARIOUS PROPERTIES OF THE SUBSOIL
Filed Nov. 30, 1940   3 Sheets-Sheet 1
INVENTOR
*Charles B. Aiken*
BY
*Hoguet, Neary & Campbell*
ATTORNEYS April 23, 1946.    C. B. AIKEN    2,398,761
METHOD AND APPARATUS FOR SIMULTANEOUS DETERMINATION
OF VARIOUS PROPERTIES OF THE SUBSOIL
Filed Nov. 30, 1940    3 Sheets-Sheet 2
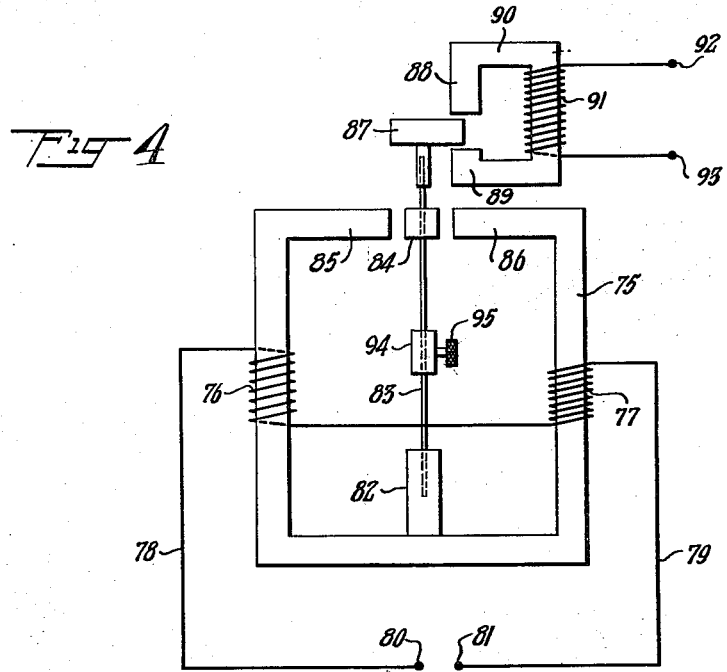
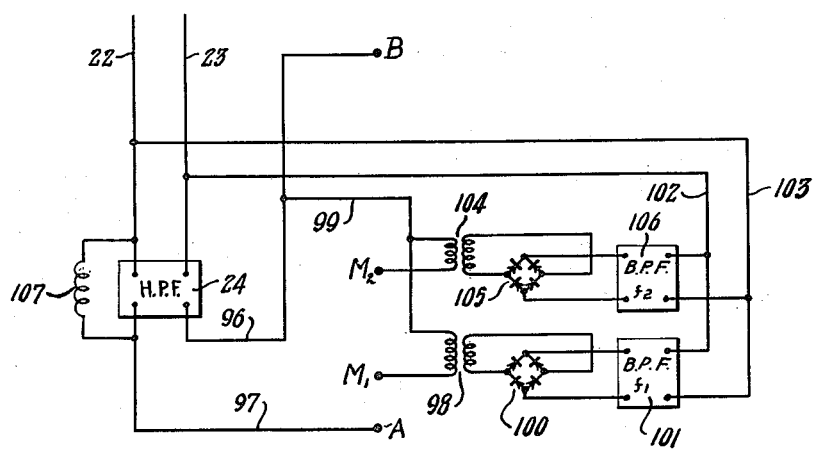
INVENTOR
Charles B. Aiken
BY
Hoguet, Neary & Campbell
ATTORNEYS April 23, 1946. C. B. AIKEN 2,398,761
METHOD AND APPARATUS FOR SIMULTANEOUS DETERMINATION
OF VARIOUS PROPERTIES OF THE SUBSOIL
Filed Nov. 30, 1940 3 Sheets-Sheet 3
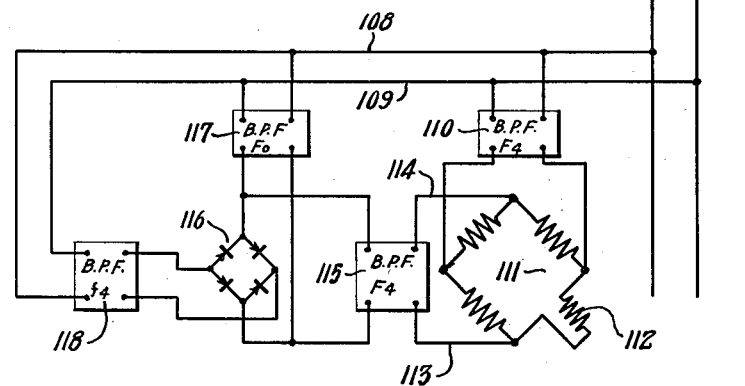
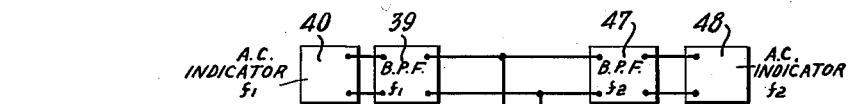
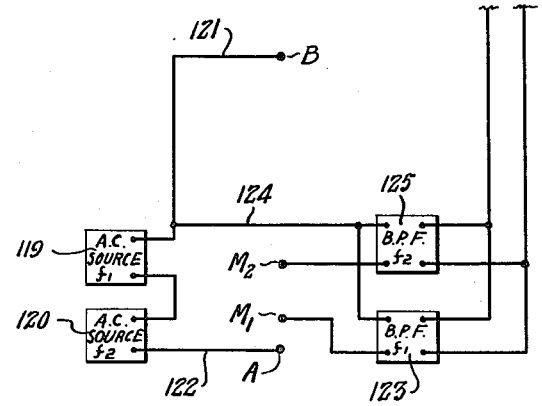
INVENTOR
Charles B. Aiken
BY
Hoguet, Neary & Campbell
ATTORNEYS Patented Apr. 23, 1946

UNITED STATES PATENT OFFICE 2,398,761

METHOD AND APPARATUS FOR SIMULTANEOUS DETERMINATION OF VARIOUS PROPERTIES OF THE SUBSOIL

Charles B. Aiken, North Plainfield, N. J., assignor to Schlumberger Well Surveying Corporation, Houston, Tex., a corporation of Delaware Application November 30, 1940, Serial No. 367,892

17 Claims. (Cl. 175—182)

The present invention relates to electrical methods and apparatus for investigating drill holes, and more particularly to methods and apparatus for obtaining indications simultaneously of a plurality of different subjects of interest in a bore hole.

In the copending applications of Henri Georges Doll, Serial No. 308,767, filed December 12, 1939, now Patent No. 2,357,177, for Method and apparatus for conducting different investigations simultaneously in a bore hole, and Serial No. 308,942, filed December 13, 1939, now Patent No. 2,357,178, for Method and apparatus for investigating bore holes, there are disclosed methods and apparatus utilizing a single electrical circuit between investigation apparatus in the bore hole and the surface of the earth, for investigating simultaneously a plurality of different subjects of interest in the bore hole. This is accomplished by producing in the bore hole a plurality of alternating currents of different frequencies, each of which is related to a subject under investigation, and transmitting these currents through the single electrical circuit to the surface of the earth where they are separately indicated by suitable indicating means.

The present application is addressed to analogous methods and apparatus for carrying out electrical investigations of this character simultaneously and with improved accuracy.

It is an object of the present invention to provide a new and improved method and apparatus employing a single electrical circuit extending from the surface of the earth to investigation apparatus in the bore hole for simultaneously investigating a plurality of different subjects of interest therein, in which electrical responses are obtained at the surface which are related to changes in the respective subjects of interest being investigated.

Another object of the invention is to provide a new and improved method and apparatus of the above character wherein the amplitudes of the several electrical responses obtained are approximately the same when the magnitudes of the various properties being measured are the same or bear some predetermined relation to each other.

The inventive idea involved is capable of being expressed in a number of forms, certain of which, for the purpose of illustrating the invention, are shown in the accompanying drawings wherein:

Fig. 1 is a schematic diagram of apparatus constructed according to the invention for obtaining indications simultaneously of resistivity and spontaneous potentials in a drill hole;

Fig. 2 is a circuit diagram of the apparatus shown in Fig. 1;

Fig. 3 is a diagram of means for calibrating the sensitivity of response of the circuits shown in Fig. 2;

Fig. 4 is an illustration of an electro-mechanical filter such as may, if desired, be used in the circuits of Fig. 2;

Fig. 5 illustrates another embodiment of the invention;

Fig. 6 is a schematic diagram of a bridge type thermometer constructed in accordance with the invention; and Fig. 7 is a modification of the invention wherein a plurality of oscillators of different frequencies are located in the drill hole.

In Fig. 1 of the drawings, the invention is shown as embodied in apparatus for simultaneously obtaining indications of the resistivity of subterranean formations at a plurality of different depths of investigation and of spontaneous potentials in the drill hole. The investigation apparatus shown generally at 10 is suspended on a two conductor cable 11 which is adapted to be raised and lowered in the drill hole 12 by means of a conventional power winch 13 located at the surface of the earth.

At the surface of the earth is located generating means indicated generally at 14, which is adapted to supply a plurality of alternating currents of different frequencies through the two conductors in the cable 11 to the investigation apparatus 10 in the drill hole 12. The investigation apparatus 10 is designed to provide a plurality of alternating currents, different in frequency from each other and from those generated at the surface, each of which is a function of a subject to be investigated in the bore hole. These currents are transmitted to the surface through the conductors in the cable 11 and they are separately indicated by suitable indicating means designated generally by the numeral 15.

Referring now to Fig. 2, the generating means 14 at the surface of the earth comprises a plurality of generators 16a, 16b, 16c and 16d, which generate alternating currents of frequencies $F_0$, $F_1$, $F_2$ and $F_3$, respectively. Inasmuch as the generator circuits are similar, it will be necessary to describe only one in detail, and corresponding parts in the drawing will be designated by corresponding reference characters with appropriate subscripts.

The generator 16a is connected to a filter 17a, the output of which is fed through an ammeter 18a to the input terminals of a second filter 19a. The output of the filter 19a is connected through a current stabilizing impedance 20a to the input terminals of a high pass filter 21 whose output terminals in turn are connected to the conductors 22 and 23 in the cable 11.

The filter 17a is designed to pass the frequency $F_0$ and to discriminate sharply against the frequencies developed by the other generators. The filter 19a is also designed to pass the frequency $F_0$, but it is less sharply discriminative than filter 17a. The purpose of this construction is to insure that the current indicated by the meter 18a, or some known fraction thereof, will be passed on by the filter 19a at all times without undergoing any undesired attenuation such as might occur due to a slight change in frequency of the generator 16a or to a slight mistuning of the filter 19a. A double filter system of this type is, of course, not essential, but it is an aid to the maintenance of proper operation conditions.

The impedance 20a is intended to stabilize the current, that is, to reduce any fluctuations in current which may be caused by changes in the impedance of the circuit. It is preferably a resistance, although an inductive impedance may be used, if desired. If an impedance is employed, it should be designed to have a very constant inductance throughout the range of current encountered in a single cycle, in order to prevent the generation of harmonics and of frequencies equal to the sum of those of the voltages impressed upon this impedance. The impedance 20a serves largely as a convenience and may be omitted, if desired, since a constant current, while preferred, is not essential.

In a similar manner, alternating currents of frequencies $F_1$, $F_2$ and $F_3$ are supplied from the respective generators 16b, 16c and 16d to the conductors 22 and 23 in the cable 11.

At the lower end of the cable 11, alternating currents of frequencies $F_0$, $F_1$, $F_2$ and $F_3$ pass through a high pass filter 24 and thence through a transformer 25 to frequency converting means, such as for example, a balanced bridge type rectifier 26. The output of the rectifier 26 passes through a low pass filter 27 to a pair of spaced apart electrodes A and B which are adapted to set up a plurality of separably different electrical fields in the earth formations surrounding the bore hole 12.

The electrode A is located at the depth in the hole at which the exploration is taking place, while the electrode B is preferably located a substantial distance from it. If the supporting cable 11 has one uninsulated conductor in contact with the drilling fluid in the drill hole 12, this may serve as the electrode B. If both conductors of the cable 11 are insulated, the electrode B may be located at the surface of the earth, one of the connections from the filter 27 being made to the conductor 23, the upper end of which is then connected to a low resistance ground. It is also possible to use a single insulated conductor in the cable 11 and to replace the conductor 23 by the return path through the earth. In this case, the point 28 should be grounded and point 28a connected to the electrode B.

In some cases, the filter 24 may be omitted and the transformer 25 designed so that it does not readily pass low frequencies, thereby acting as a high pass filter of a sort. However, the construction shown is preferred.

The rectifier 26 is preferably of the dry type, such as, for example, a copper oxide rectifier, but it may be made up of elements such as hot cathode thermionic rectifiers or cold cathode gas tube rectifiers. If the hot cathode type is used, batteries must be included in the investigation apparatus 10, or else cathode heater current must be transmitted from the surface. In the latter case, the conductors 22 and 23 in the cable 11 are not available for use in studying the naturally occurring potentials in the drill hole 12.

In view of the well known non-linear action of the rectifier bridge 26, it will be readily apparent that its output will include many frequency components which are not present in its input. If it is perfectly balanced, the input frequencies will not appear in its output. In practice, however, a small amount of unbalance is to be expected.

For convenience, the frequencies $F_0$ to $F_3$ developed by the generators 16a, 16b, 16c and 16d, respectively, will be called primary frequencies, and the various additional components developed by the non-linear action of the rectifier 26 will be designated derived frequencies. The derived frequencies which are of greatest interest in the present process are $f_1=F_0-F_1$, $f_2=F_0-F_2$ and $f_3=F_0-F_3$. These will be called the principal derived frequencies. In order that the filter 27 may be designed to transmit certain of the principal derived frequencies and to exclude the primary frequencies $F_0$ to $F_3$, the latter should preferably be so chosen that $f_1$, $f_2$ and $f_3$ are lower than the lowest of the primary frequencies.

The action of the rectifier 26 is such that if the magnitude of the current of frequency $F_0$ is made considerably larger than the magnitude of the other primary currents, the derived currents of frequencies $f_1$, $f_2$, $f_3$ will be very much larger than any other derived currents generated by the rectifier 26. These principal components can then be used for investigating the earth formations with reduced chances of disturbance by other derived frequencies, such as, for example, $2(F_0-F_1)$, $2F_0-F_1$. In order to accomplish this desirable result, it is preferable that the amplitude of $F_0$ be three or more times that of any of the other primary frequencies.

In the form of the apparatus shown in Fig. 1, a plurality of spaced apart receiving or pick-up electrodes $M_1$, $M_2$, $M_3$ and $N_3$ are located in the vicinity of the current electrode A. The current flow through the medium surrounding the electrode A impresses upon each of these electrodes, alternating potentials of all of the derived frequencies passed by the filter 27.

The electrode $M_1$ is connected through the conductor 29 to one terminal of a selective filter 30, the other terminal of which is connected through the conductors 31 and 32 to the electrode B. The filter 30 is designed to pass voltages of frequency $f_1$ only, and its output is fed to an adjustable attenuator 33, the terminals of which are connected to the conductors 22 and 23 in the cable 11. Inasmuch as this is the only voltage of frequency $f_1$ that reaches the cable conductors 22 and 23, it may effectively be employed to provide indications of the resistivity of the earth formations in the vicinity of the drill hole 12.

The output of frequency $f_1$ from the attenuator 33 is transmitted through the cable conductors 22 and 23 and through the conductors 34 and 35 to a low pass filter 36 at the surface of the earth, which is designed to pass the derived frequencies and to discriminate against the primary frequencies. To this end, it should have a cut-off frequency substantially below the lowest of the primary frequencies.

From the filter 36 the voltage of frequency $f_1$ passes through the conductors 37 and 38 to a selective filter 39 which is tuned to the frequency $f_1$, whence it is supplied to suitable measuring or indicating means 40, preferably of the recording type. The response of the indicating means 40 thus indicates the magnitude or variations in the magnitude of one particular resistive property of the earth formations, in this case, the resistance near the drill hole 12.

The electrodes $M_2$, in similar fashion, is connected through a conductor 41 to one terminal of a second selective filter 42, the other terminal of which is connected through the conductors 43 and 32 to the electrode B. The filter 42 is designed to pass only the frequency $f_2$ and to discriminate against the other derived frequencies. Voltage of frequency $f_2$ is transmitted from the filter 42 through an adjustable attenuator 44 to the conductors 22 and 23 in the cable 11.

This voltage, after passing through the filter 36 at the surface of the earth, is transmitted through the conductors 45 and 46 to a selective filter 47, which is tuned to the frequency $f_2$. From the filter 47 it is fed to the indicating or measuring instrument 48, providing indications of the resistivity of the formations at a different depth of investigation.

The potential electrodes $M_3$ and $N_3$ are connected to a transformer 49, the secondary winding of which is connected to a selective filter 50 which is designed to pass currents of frequency $f_3$ only. The output of this filter is transmitted through the conductors 51 and 52 and the conductors 22 and 23 in the cable 11 to the surface of the earth. Here, it passes through the low pass filter 36, the conductors 53, 54 and the selective filter 55 to the measuring or indicating instrument 56, providing indications of a resistive property of the formations at a third depth of investigation.

It is important that any voltage of frequency $f_1$ finding its way to the conductors 22 and 23, through paths other than filter 30 should be quite small as compared with that passing through the filter 30, since otherwise the magnitude of the voltage of this frequency transmitted to the surface will not be a true measure of the voltage of frequency $f_1$ picked up by the electrode $M_1$. Similarly, the only appreciable voltages of frequencies $f_2$ and of $f_3$ should reach the cable 11 through the filters 42 and 50, respectively.

These conditions will be most easily fulfilled if the attenuators 33 and 44 are so adjusted that when the group of exploring electrodes is situated in a uniform medium, the voltages of the three frequencies reaching the cable conductors 22 and 23 are of approximately the same magnitude. In the embodiment shown in Fig. 2, the voltage picked up by the electrodes $M_3$ and $N_3$ is the smallest of the three pick-up voltages so that no attenuator is included in its circuit.

The natural potentials which occur in the drill hole may be investigated by means of the electrode $M_s$ which is located in the bore hole near the electrode A. To this end, the electrode $M_s$ is connected through a conductor 57 to one terminal of a filter 58, which is designated to discriminate against the alternating current and to pass only direct current. The other input terminal of the filter 58 is connected to the corresponding output terminal and the output of the filter 58 is transmitted through the conductor 59 and 60 and the conductors 22 and 23 in the cable 11 to the surface of the earth.

At the surface of the earth, the natural potentials are transmitted through the conductors 34 and 35 and the low pass filter 36 to a second low pass filter 61, the output of which is supplied to suitable indicating means 62, such as, for example, a direct current voltmeter, potentiometer or other potential indicating instrument. The cut-off frequency of the filters 36 and 61 should not be made too low or else it will be impossible to follow moderately rapid changes in the voltage picked up by the electrode $M_s$ as it is moved along the drill hole 12.

The primary frequencies $F_0$–$F_3$ should be preferably chosen so that the principal derived frequencies $f_1$, $f_2$ and $f_3$ differ by substantial amounts from any other derived components of appreciable magnitude that may be present in the output of the rectifier 26. An example of a suitable group of primary frequencies is presented below. There are also listed the desired derived frequencies in cycles per second and some of the more important undesired components.

*Primary frequencies*

$F_0 = 350$
$F_1 = 296$
$F_2 = 278$
$F_3 = 255$

*Desired derived frequencies*

$f_1 = 54$
$f_2 = 72$
$f_3 = 95$

*Principal undesired components*

| | | |
|---|---|---|
| $2f_1 = 108$ | $F_1 - F_2 = 18$ | $2(F_1 - F_2) = 36$ |
| $2f_2 = 144$ | $F_1 - F_3 = 41$ | $2(F_1 - F_3) = 82$ |
| $2f_3 = 190$ | $F_2 - F_3 = 23$ | $2(F_2 - F_3) = 46$ |

For the numerical values shown in this example, the cut-off frequency for the high-pass filters 21 and 24 might be about 210 cycles, while the cut-off frequency of the low-pass filters 36 and 27 might be about 125 cycles. With this spread between the two cut-offs, the separation of the primary from the principal derived frequencies is facilitated.

In Fig. 3 is shown a resistance network which may be used to calibrate the sensitivities of the respective electrode circuits of Fig. 2 when the investigation apparatus 10 is at the surface of the earth. This network comprises a plurality of series connected resistances 64, 65, 66, 67, and 68, whose sum is preferably equal to the resistance of electrodes A and B in series with the earth path between them under average sub-soil conditions.

The values of the respective resistances are so chosen that the potentials of the points 69 and 70 with respect to the point 71 are approximately equal to the values of the voltages of the electrodes $M_2$ and $M_1$, respectively, with respect to the current electrode B under average operating conditions. Similarly, the potential difference between the electrodes 72 and 73 is approximately equal to that normally found between the electrodes $M_3$ and $N_3$.

The calibration may be accomplished by connecting the electrodes B, $N_3$, $M_3$, $M_2$, $M_1$ and A to the points 71, 72, 73, 69, 70 and 74, respectively, on the resistance network. When the current meters 18a, 18b, 18c and 18d read their normal values, the sensitivities of the attenuators 33 and 44 or of the individual measuring or indicating devices 40, 48 and 56, can be adjusted until any desired value of deflection is obtained.

Fig. 4 shows a diagram of an electro-mechanical filter such as might be used in place of the electrical filters 30, 42 and 50, for selecting voltages of frequencies $f_1$, $f_2$ and $f_3$. The filter comprises a U-shaped magnetic core 75 upon the respective arms of which are wound, series aiding, a pair of coils 76 and 77. The coils 76 and 77 are connected in series through the conductors 78 and 79, respectively, to the input terminals 80 and 81.

Within the core 75 is disposed a bar magnet 82 to which is secured a spring member 83 at the upper end of which is provided a soft iron armature 84 which is adapted to vibrate between the pole pieces 85 and 86 of the core 75. At the upper extremity of the spring 83 is secured a second soft iron armature 87 which is adapted to move between the pole pieces 88 and 89 on a U-shaped permanent magnet 90, on which is wound a pick-up coil 91 which is connected to the output terminals 92 and 93.

When an alternating voltage is impressed upon the terminals 80 and 81, the spring member 83 is set into vibration. This causes the armature 87 to move into and out of the space between the pole peices 88 and 89 on the core 90, producing variations in the magnetic circuit and inducing a voltage in the winding 89, the frequency of which is the same as that of the vibrating spring member 83.

The resonant frequency of the system may be adjusted by means of a weight 94 which is mounted on the spring 83 and the position of which may be adjusted by means of a set screw 95. The sharpness of the filter can be controlled, if necessary, by the addition of a damping fin (not shown) on the spring 83.

It will be noted that the electrodes $M_1$ and $M_2$ in Fig. 2 form parts of convenient "two electrode circuits" (Schlumberger Patent No. 1,894,328), while the electrodes $M_3$ and $N_3$ are included in a "three electrode circuit" (Schlumberger Patent No. 1,819,923). A wide variety of other arrangements is, of course, possible.

In the embodiment shown in Fig. 5, the output of the high pass filter 24 is connected directly to the current electrodes B and A through the conductors 96 and 97. The electrodes $M_1$ and $M_2$ are provided, as in Fig. 2. The electrode $M_1$ is connected to the primary winding of a transformer 98, the other terminal of which is connected through the conductors 99 and 96 to the electrode B.

The secondary winding of the transformer 98 is connected to a bridge type rectifier 100, the output of which is supplied to a selective filter 101, which is designed to pass only voltages of the derived frequency $f_1$. The output of this filter is supplied through the conductors 102 and 103, respectively, to the conductors 22 and 23 in the cable 11, through which it is transmitted to the indicating equipment 15 at the surface of the earth. It will be noted that the high-pass filter 24 prevents voltage of the derived frequency $f_1$ from reaching the electrodes A and B.

In similar fashion, the electrode $M_2$ is connected to the primary winding of the transformer 104, the other terminal of which is connected through the conductors 99 and 96 to the electrode B. The secondary winding of the transformer 104 is connected to a bridge type rectifier 105, the output of which passes through a selective filter 106, designed to pass only voltages of the frequency $f_2$, and through the conductors 102 and 103 to the conductors 22 and 23 in the cable, whence it is transmitted to the indicating equipment 15 at the surface of the earth.

An attenuator may be included in the circuit of the filter 101 if desired, although if the distance between the electrodes $M_2$ and A is not more than two or three times the distance between the electrodes $M_1$ and A, this may not be necessary.

If it is desired to obtain indications of the naturally occurring potentials with the circuit shown in Fig. 5, this may be done by connecting a relatively high impedance 107 across the conductors 22 and 97, which will pass direct current, but will discriminate sharply against the alternating current of all frequencies. If, for some special application, indications of the natural potentials are not desired, impedance 107 may be omitted.

Fig. 6 shows the circuits of an electrically operated thermometer that may be connected to the lower end of the conductors 22 and 23 in the cable 11 and operated simultaneously with the resistivity and natural potential apparatus of Figures 2 and 5. For this purpose, an additional primary frequency $F_4$ may be supplied through the conductors 108 and 109 to a selective filter 110, the output of which is impressed on one diagonal of a bridge type resistance thermometer 111.

The output of the bridge 111 will be controlled by the degree of its unbalance which is, in turn, dependent upon the resistance of a thermometric element 112 in one arm thereof which is proportional to the temperature. This output, which is also of frequency $F_4$, is transmitted through the conductors 113 and 114 to a selective filter 115, the output of which is impressed upon a bridge type rectifier element 116. The rectifier 116 is also supplied with a voltage of frequency $F_0$ from the cable conductors 22 and 23 through the conductors 108 and 109 and through a selective filter 117.

It will be apparent from what has been said above that the output of the rectifier 116 will contain voltages of the derived frequency $$f_4 = F_0 - F_4$$

Voltage of this frequency is fed from the rectifier 116 through the selective filter 118 and the conductors 108 and 109 to the conductors 22 and 23 of the cable 11, whence it is transmitted to the indicating apparatus located at the surface of the earth.

In the embodiment illustrated in Fig. 7, voltages of two (or, if desired, more) frequencies are generated by the generators 119 and 120 in the bore hole, and are supplied through the conductors 121 and 122 to the electrodes A and B thereby setting up electrical fields in the formations. From these fields, voltages of both frequencies are impressed upon the electrodes $M_1$ and $M_2$. However, the electrode $M_1$ is connected to one of the input terminals of a selective filter 123 which responds only to voltages of the frequency $f_1$, the other terminal of which is connected through the conductors 124 and 121 to the electrode B. The output of the filter 123 is transmitted through the cable conductors 22 and 23 to the indicating apparatus located at the surface of the earth.

The electrode $M_2$, in similar fashion, is connected to one of the input terminals of a selective filter 125, the other terminal of which is connected through the conductors 124 and 121 to the electrode B, and the output of the filter 125 is supplied to the conductors 22 and 23 in the cable

II through which it is transmitted to the indicating apparatus located at the surface of the earth.

Although I have described my invention in detail and have therefore employed certain specific terms and shown certain specific circuits, it is to be understood that the present disclosure is illustrative rather than restrictive and changes and modifications may be resorted to without departing from the spirit or scope of the appended claims.

I claim:

1. A method of investigating simultaneously a plurality of different subjects of interest in a bore hole, which comprises producing a first group of superimposed alternating currents of different frequencies at the surface of the earth, transmitting said superimposed currents to a given location in the bore hole, utilizing said superimposed alternating currents at said location in the bore hole to provide a group of superimposed alternating current values which are different in frequency from each other and from the currents of said first group and each of which is a function of a subject under investigation, transmitting said group of superimposed alternating current values to the surface of the earth, and separately obtaining indications of each of the alternating current values in said group.

2. A method of investigating simultaneously a plurality of different subjects of interest in a bore hole, which comprises producing a first group of superimposed alternating currents of different frequencies at the surface of the earth, transmitting said superimposed currents to a given location in the bore hole, rectifying said superimposed currents at said location in the bore hole to provide a second group of superimposed alternating currents which are different in frequency from each other and from the currents of said first group, utilizing said second group of currents to provide a third group of superimposed alternating currents of the same frequencies as the second group, each of which is a function of a subject under investigation, transmitting said third group of superimposed currents to the surface of the earth, and separately obtaining indications of each of the alternating currents in said third group.

3. A method of investigating simultaneously a plurality of different subjects of interest in a drill hole which comprises generating at the surface of the earth a first group of alternating currents of different frequencies, at least one of said currents being substantially greater in magnitude than the others, combining said group of alternating currents, transmitting said combined alternating currents to locations at different depths in the drill hole, rectifying said combined currents at each of said locations to produce a second group of alternating currents which are different in frequency from each other and from the currents of said first group, utilizing said second group of currents to provide a third group of alternating currents of the same frequencies as the second group, each of which is a function of a subject under investigation, the currents in said third group all being of substantially the same order of magnitude, combining the currents in said third group, transmitting the combined currents of said third group to the surface of the earth, separating the combined currents in said third group, and obtaining indications of said separated currents.

4. A method of investigating simultaneously a plurality of properties of earth formations traversed by a bore hole comprising producing at the surface of the earth a first group of superimposed alternating currents of different frequencies, transmitting said superimposed alternating currents to a given location in the bore hole, converting said first group of superimposed alternating currents at said location to a second group of alternating currents which are different in frequency from each other and from the currents in said first group, passing said second group of alternating currents through the earth formations surrounding the bore hole at said location therein, picking up in the bore hole alternating current values of different frequencies which are related to the passage of said second group of alternating currents through the formations, and each of which is a function of a property of the formations, combining said alternating current values, transmitting said combined alternating current values to the surface of the earth, and separately obtaining indications of each of said alternating current values of different frequencies.

5. A method of investigating simultaneously a plurality of properties of earth formations traversed by a bore hole, comprising producing at the surface of the earth a first group of superimposed alternating currents of different frequencies, transmitting said superimposed alternating currents to a given location in the bore hole, passing said first group of alternating currents through the earth formations surrounding the bore hole at said location, picking up in the bore hole alternating current values of different frequencies related to the passage of said first group of alternating currents through the formations, each of which is a function of a property of the said formations, converting each of said alternating current values to an alternating current value which is different in frequency from the currents of said first group, each of said converted alternating current values being different in frequency from the others, combining said converted alternating current values, transmitting said combined alternating current values to the surface of the earth, and separately obtaining indications of each of said combined values.

6. A method of investigating simultaneously a plurality of different properties of earth formations traversed by a bore hole and spontaneous potentials existing therein comprising, generating at the surface of the earth a first group of alternating currents of different frequencies, at least one of said alternating currents being substantially greater in magnitude than the others, combining said generated alternating currents, transmitting said combined currents to a given location in the bore hole, rectifying said combined currents at said location to produce a second group of alternating current which are different in frequency from each other and from the currents in said first group, passing said second group of currents through the earth formations surrounding the bore hole, picking up in the bore hole alternating current values of different frequencies which are produced by the flow of said second group of currents through the formations, and each of which is a function of a property of the formations, picking up direct current values in the bore hole which are related to spontaneous potentials existing therein, combining said alternating and direct current values, transmitting said combined values to the surface of the earth, and separately obtaining indications of each of said alternating and direct current values.

7. In apparatus for investigating simultaneously a plurality of different subjects of interest in a bore hole, the combination of means for simultaneously producing a plurality of alternating currents of different frequencies in the bore hole, means for passing said alternating currents through the earth formations surrounding the bore hole, a plurality of pickup means in the bore hole, each responsive only to alternating current values of a selected frequency, for picking up alternating current values produced by the passage of said alternating currents through the formations, means for combining said alternating current values, a single electrical circuit for transmitting said combined alternating current values to the surface of the earth, and indicating means at the surface of the earth for separately providing indications of said combined alternating current values.

8. Apparatus for simultaneously investigating a plurality of different subjects of interest in a bore hole comprising frequency converting means disposed in the bore hole, means at the surface for generating a first group of alternating currents of different frequencies, a single electrical circuit for transmitting said group of alternating currents from said generating means to said frequency converting means to provide a second group of alternating currents different in frequency from each other and from the currents in said first group, means electrically connected to said frequency converting means for producing a plurality of alternating current values corresponding in frequency to the currents in said second group, each of which is a function of a subject under investigation, means for introducing said alternating current values into said electrical circuit, and indicating means connected to said circuit at the surface of the earth for separately providing indications of said alternating current values.

9. Apparatus for investigating simultaneously a plurality of characteristics of earth formations traversed by a bore hole comprising, means at the surface for generating a group of alternating currents of different frequencies, investigation means disposed in the bore hole, a single electircal circuit for supplying said group of alternating currents from the generating means to the investigation means, said investigation means being adapted to provide a plurality of alternating current values different in frequency from each other and from the currents of said group, each of which is a function of a subject to be investigated, electrical connections between said investigating means and the single electrical circuit for introducing therein said alternating current values, and electrical means connected to said circuit at the surface for separately providing indications of said alternating current values.

10. Apparatus for investigating simultaneously a plurality of different electrical characteristics of earth formations traversed by a bore hole, comprising, means at the surface for generating a first group of alternating currents of different frequencies, frequency converting means disposed in the bore hole, a single electrical circuit for transmitting said group of alternating currents from the generating means to the frequency converting means in the bore hole to produce a second group of alternating currents which are different in frequency from each other and from the currents in said first group, a pair of spaced apart electrodes connected to said frequency converting means for passing said second group of alternating currents through the earth formations surrounding the bore hole, a plurality of pickup circuits disposed in the bore hole for picking up alternating current values of different frequencies produced by the flow of said second group of currents through the formations, each of said circuits being responsive to alternating current values of one frequency only, electrical connections between said pickup circuits and said single electrical circuit for introducing said alternating current values therein, and indicating means electrically connected to said single electrical circuit at the surface for providing separate indications of each of said alternating current values of different frequencies.

11. Apparatus for investigating simultaneously a plurality of different electrical characteristics of earth formations traversed by a bore hole, comprising, means at the surface for generating a plurality of alternating currents of different frequencies, means for passing said alternating currents through the earth formations surrounding the bore hole, a plurality of pickup circuits for picking up in the bore hole alternating current potentials produced by said current flows through the formations, each of which is a function of a subject under investigation, frequency converting means in each of said circuits for converting the alternating current potentials picked up into alternating current values which are different in frequency from each other and from said generated currents, filter means in each of said pickup circuits for passing alternating current values of one frequency only, electrical connections between said filter means and said single electrical circuit for introducing therein the alternating current values passed by said filter means, and indicating means connected to said single electrical circuit at the surface of the earth for obtaining separate indications of each of said last-named alternating current values.

12. Apparatus for investigating simultaneously a plurality of different electrical characteristics of earth formations traversed by a bore hole, comprising, means at the surface for generating a plurality of alternating currents of different frequencies, frequency converting means disposed in the bore hole, a single electrical circuit connecting said generating means and said frequency converting means, a plurality of pickup circuits disposed in the bore hole, filter means in each of said circuits for passing alternating current values of one frequency only, attenuating means in all but one of said pickup circuits, electrical connections between said attenuating means and said single electrical circuit, electrical connections between the filter means in the remaining pickup circuit and said single electrical circuit, and electrical indicating means connected to said single electrical circuit at the surface of the earth.

13. Apparatus for obtaining indications of temperature along a drill hole, comprising, a resistance bridge thermometer adapted to be lowered into the drill hole and having input and output terminals, means at the surface for generating a plurality of alternating currents of different frequencies, means for supplying current of first frequency from said generating means to the input terminals of the bridge, frequency converting means having input terminals connected to the output terminals of said bridge, and having output terminals, means for supplying current of second frequency to the input terminals of said frequency converting means, means connected to the output terminals of said frequency converting means for selecting an alternating current the frequency of which is different from the frequencies of said generated currents and is a function of said first and second frequencies, means for transmitting said selected alternating current to the surface of the earth, and means for providing indications of said selected current.

14. A method of investigating simultaneously a plurality of properties of earth formations traversed by a bore hole, comprising producing at the surface of the earth a first group of superimposed alternating currents of different frequencies, transmitting said superimposed alternating currents to a given location in the bore hole, converting said first group of superimposed alternating currents at said location to a second group of alternating currents which are different in frequency from each other and from the currents in said first group, passing said second group of alternating currents through the earth formations surrounding the bore hole at said location therein, picking up in the bore hole alternating current values of different frequencies which are related to the passage of said second group of alternating currents through the formations, and each of which is a function of a property of the formations, picking up a direct current value in the bore hole which is related to spontaneous potentials therein, combining said alternating and direct current values, transmitting said combined alternating and direct current values to the surface of the earth, separately obtaining indications of each of said alternating and direct current values and repeating said steps at different depths in the bore hole.

15. A method of investigating simultaneously a plurality of properties of earth formations traversed by a bore hole, comprising producing at the surface of the earth a first group of superimposed alternating currents of different frequencies, transmitting said superimposed alternating currents to a given location in the bore hole, passing said first group of alternating currents through the earth formations surrounding the bore hole at said location, picking up in the bore hole alternating current values of different frequencies related to the passage of said first group of alternating currents through the formations, each of which is a function of a property of the said formations, converting each of said alternating current values to an alternating current value which is different in frequency from the currents of said first group, each of said converted alternating current values being different in frequency from the others, picking up a direct current value in the bore hole which is related to spontaneous potentials therein, combining said converted alternating current values and direct current value, transmitting said combined alternating and direct current values to the surface of the earth, separately obtaining indications of each of said combined values, and repeating said steps at different depths in the bore hole.

16. Apparatus for investigating simultaneously a plurality of properties of earth formations traversed by a bore hole, comprising frequency converting means disposed in the bore hole, means at the surface of the earth for generating a first group of alternating currents of different frequencies, a single electrical circuit for transmitting said group of alternating currents from said generating means to said frequency converting means to provide a second group of alternating currents different in frequency from each other and from the currents in said first group, means for passing said second group of currents through the formations surrounding the bore hole, means for picking up alternating current values of different frequency produced by the passage of said second group of currents through the formations, each of which is a function of a property of the formations, and for picking up a direct current value related to spontaneous potentials in the bore hole, means for introducing said alternating and direct current values into said single electrical circuit and means electrically connected to said single electrical circuit for providing separate indications of the respective alternating and direct current values.

17. Apparatus for investigating simultaneously a plurality of properties of earth formations traversed by a bore hole, comprising electrode means disposed in the bore hole, means at the surface of the earth for generating a first group of alternating currents of different frequencies, a single electrical circuit for transmitting said group of alternating currents from said generating means to said electrode means, thereby setting up a plurality of electric fields of said different frequencies in the surrounding formations, a plurality of pickup means in the bore hole with the electrode means, for picking up alternating current values produced by said electric fields in the formations, electrical means associated with each of said pickup means for converting the respective alternating electrical values picked up thereby to alternating current values that are different in frequency from each other and from the alternating currents generated at the surface of the earth, means for picking up a direct current value related to spontaneous potentials in the bore hole, means for introducing said direct current and converted alternating current values into said electrical circuit, and means electrically connected to said single circuit at the surface of the earth for providing separate indications of said respective direct and converted alternating current values.

CHARLES B. AIKEN.